April 29, 1947.  H. D. WARSHAW  2,419,612
MAGNETIC VANE TYPE RATIOMETER
Filed May 16, 1945

INVENTOR
HOWARD D. WARSHAW
BY
ATTORNEY

Patented Apr. 29, 1947

2,419,612

UNITED STATES PATENT OFFICE 2,419,612

MAGNETIC VANE TYPE RATIOMETER

Howard D. Warshaw, Drexel Hill, Pa.

Application May 16, 1945, Serial No. 594,130

6 Claims. (Cl. 171—95)

(Granted under the act of March 3, 1883, as amended April 30, 1928; 370 O. G. 757)

This invention relates to new and useful improvements in remote indicating or telemetering systems, and particularly to an indicating unit that is operable to indicate a particular condition.

More particularly the present invention relates to an electrically operated indicating unit of the ratiometer type for use with alternating current in conjunction with a remote transmitter unit that is electrically interconnected therewith to form an impedance bridge constructed and arranged so that any change in a condition affecting the transmitter will produce a like change in the indicating element of the indicator unit.

Indicator units of the ratiometer type produced prior to the present invention are constructed and arranged for use with direct current only and will not operate with alternating current because the rotor elements thereof are such that they tend to follow the changes in polarity of the alternating current field with the result that, in the case of low frequency alternating current the rotor elements continuously hunt back and forth across the indicating scale in response to changes in the polarity of the field and, in the case of high frequency alternating current, the inertia of the rotor elements is too great to permit them to move at all in response to the rapid changes in polarity, and no true indication is obtainable in either case.

There is a definite need in industry and in the war effort for an indicator unit of the ratiometer type that may be used with alternating current and, with this in mind, the principal object of the present invention is to provide an indicating ratiometer that is constructed and arranged to provide accurate and efficient operation with alternating current.

Another object of the present invention is to provide a novel and improved indicator unit of the ratiometer type that is operable in response to two directionally fixed magnetic fields in accordance with the ratio of the magnitudes of the alternating currents producing said magnetic fields.

A further object of the present invention is to provide a novel indicator unit of the stated character comprising two pairs of coils positioned at a predetermined fixed angle with respect to each other, a member of highly permeable magnetic material rotatable within said coils and operable to align itself with the resultant of the two directionally fixed magnetic fields thereof and a pointer carried by the member for indicating the position thereof rotationally with respect to said coils.

Still a further object of the present invention is to provide a novel indicator unit of the stated character having means operable to pull the indicating pointer off the scale when the indicator is deenergized, together with novel means operable when the indicator is energized to nullify the effect of said pull-off means.

These and other objects of the invention and the various features and details of the construction and operation thereof are hereinafter fully set forth and described with reference to the accompanying drawing in which.

Figure 1:
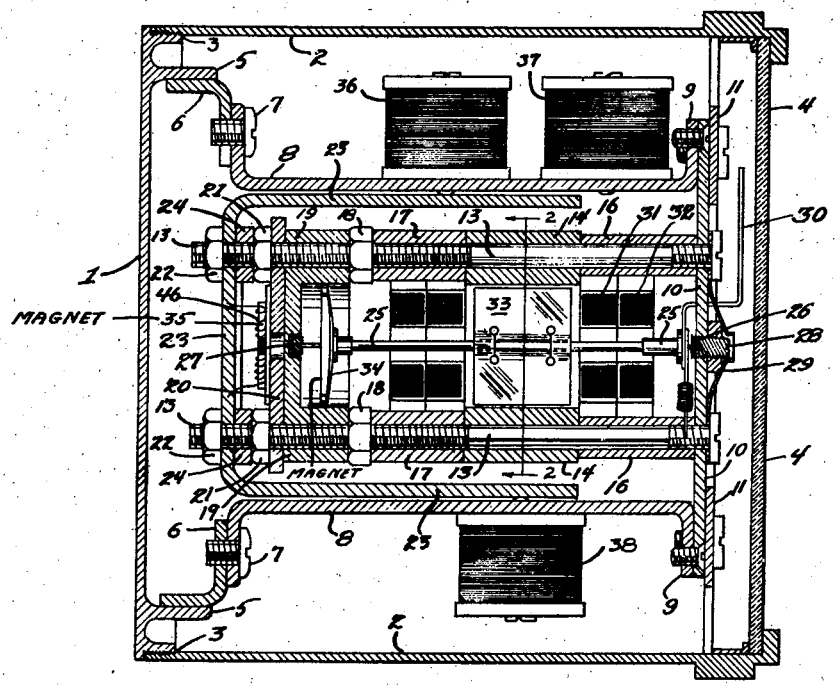
Fig. 1 is a sectional view axially through indicator unit made in accordance with the present invention.

Referring now to the drawing, and particularly to Fig. 1 thereof, an indicator unit made in accordance with the present invention may include a housing or casing structure comprising a base member 1 and a tubular wall member 2 which may be threaded on to the base member 1 as indicated at 3 and provided at its other end with a window 4 of transparent material such as for example, glass, plastic or the like. Suitably secured to an upstanding flange portion 5 of the base member 1 at diametrically opposite points thereon are inverted L shaped support elements 6 to each of which is secured, for example, by screws or the like 7, one end of a bracket member 8. The upper ends 9 of the brackets 8 have secured thereto an arcuate frame plate 10, and the latter in turn has secured thereto a face plate or the like 11 that is provided with a suitable indicating scale 12 thereon (see Fig. 4).

Extending longitudinally of the indicator unit and parallel to the axis thereof to a point substantially adjacent the base member 1, are elongated screw or bolt members 13 that have their head portions supported in the aforesaid frame plate 10. The screws or bolts 13 are disposed in predetermined spaced parallel relation with respect to each other as shown. Supported upon the screws or bolts 13 is a coil support form 14 that is composed of a non-metallic material such as, for example, Bakelite, plastic and the like. The coil support form 14 is provided with a circular bore or opening 15 of substantial diameter therethrough and the coil support form 14 is positioned upon the screws or bolts 13 in predetermined spaced relation with respect to the frame plate 10 by means of spacer sleeves 16 provided on said screws or bolts 13. At the opposite side of the coil support form 14 from the spacers 16 suitable spacer sleeves 17 likewise are positioned upon the screws or bolts 13 and this assembly, comprising the spacer sleeves 16 coil support form 14 and spacer sleeves 17 are secured upon the bolts or screws 13, in the described relationship with respect to the frame plate 10, by means of nuts or the like 18 which are threaded on said screws or bolts 13 endwise of the spacer sleeves 17 as shown.

Also positioned upon the screws or bolts 13 outwardly endwise of the nuts 18 is a cup shaped housing member 19 that is composed of a material having good electrical conductivity. Endwise of this cup shaped member 19 is a bracket member 20 of non-magnetic material the purpose for which will appear hereinafter. The bracket member 20 and the cup shaped housing 19 are secured upon the screws or bolts 13 in the described relationship by means of nuts or the like 21 threaded thereon.

Figure 3:
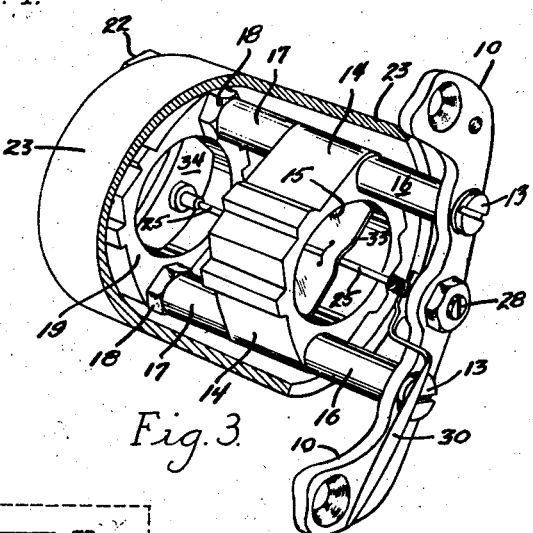
Fig. 3 is a perspective view showing the construction relationship of certain operative mechanisms of the indicator unit of Fig. 1.

In addition to the foregoing, there is secured upon the screws or bolts 13, for example, by nuts or the like 22 a cup shaped shield member 23 that is composed of highly permeable magnetic material. The base of the shield cup 23 preferably is suitably spaced from the bracket member 20 by means of suitable spacers 24 positioned upon the screws or bolts 13 intermediate the shield 23 and the nuts 21 previously described. As shown in the drawing the shield cup 23 has a depth such that the wall portion thereof surrounds and shields the previously mentioned bracket 20, housing 19, spacer sleeves 17 and the coil support form 14 in the manner best shown in Figs. 1 and 3 of the drawing.

Extending coaxially through the circular bore or opening 15 in the coil support form 14 is a shaft 25 that has its opposite end portions rotatably journalled in suitable jewel bearings 26 and 27 provided respectively in the frame plate 10 and in the housing 19. As shown the bearing 26 is adjustable by means of a screw 28 held in the position to which adjusted by bow spring or the like 29. Carried by the shaft 25 adjacent the frame plate 10 is a pointer member 30 that has a portion thereof extending outwardly beyond the frame plate 10 with its free end portion disposed in outwardly overlying relation with respect to the face plate 11, the arrangement being such that as the shaft 25 is rotated, the free end portion of the pointer member 30 will sweep across the indicating scale 12 provided exteriorly on the dial plate 11.

Figure 2:
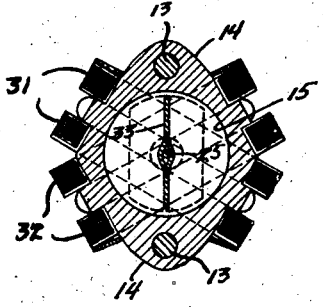
Fig. 2 is a sectional view taken on line 2—2, Fig. 1.

Suitably mounted upon the coil support form 14 are two sets of coils 31 and 32 arranged so that the coils of one set are disposed at a predetermined angle with respect to the coils of the other set, for example, as best shown in Fig. 2 of the drawing. The particular angular relation of the two sets of coils 31 and 32 is determined by the length of the indicating scale 12 or, in other words, by the extent of sweep through which the free end portion of the pointer member 30 is adapted to travel or sweep over the dial face 11 relative to the scale 12 thereon, and suitable stops (not shown) are provided for limiting the movement of the pointer member 30 and shaft 25 to that extent.

Secured upon the shaft 25 for rotation therewith within the circular bore or opening 15 in the coil support form 14 is a vane element 33 that is composed of highly permeable magnetic material. The vane element 33 may be secured upon the shaft 25 by threading the same thereon in the manner shown in the drawing so that equal portions of said vane element are disposed at respectively opposite sides of the shaft 25 in order that the vane element 33 may be perfectly balanced rotationally with respect to the said shaft 25.

Also secured upon the shaft 25 and rotatable therewith is a permanent magnet element 34 that cooperates with the magnetic housing 19 to damp the movement of the shaft 25 and its associated vane element 33 and pointer 30. In addition to the permanent magnet 34 that is secured upon the shaft 25, there is secured to the bracket member 20 at the outer side thereof a smaller permanent magnet 35 that is positioned with respect to the indicator unit in approximately the same angular relation as the zero mark of the indicating scale 12 on the dial face 11. This permanent magnet 35 functions in cooperation with the permanent magnet 34 to return the shaft member 25 and its associated vane 33 and pointer 30 to the zero position of the indicator unit scale when the unit is deenergized. Suitably secured or mounted upon the bracket members 8 outwardly thereof are circuit resistors 36, 37 and 38, respectively, which may take the form of coils as shown in the drawing.

As shown and described, the coils 31 and 32 are fixed in position at a predetermined angle with respect to each other and it will be evident that when an alternating current is caused to flow through said coils there will be produced two magnetic fields that are fixed in their respective directions. However the resultant magnetic field of these two directionally fixed fields will have a direction that is a function of the ratio of the magnitudes of the alternating currents passing through the coils 31 and 32. As previously stated the coil support form 14 is of non-magnetic material with the result that eddy current losses in that member are eliminated and there is no obstruction or diversion of the magnetic fields of the coils 31 and 32 that would occur were the form 14 fabricated of magnetic material. Furthermore, by fabricating the vane element 33 of magnetic material characterized by its high, substantially constant permeability, said vane 33 is highly receptive to the passage of the fields of the coils 31 and 32 and the rapid changes in polarity of the alternating current do not affect the position of the vane 33 which will align itself, and hence the pointer 30, with the resultant field vector of the two directionaly fixed magnetic fields produced by the alternating currents applied to the sets of angularly related coils. Thus by varying the ratio of the alternating currents passing through the angular related sets of coils 31 and 32 the pointer member 30 will move over the scale 12 on the dial face 11.

Figure 4:
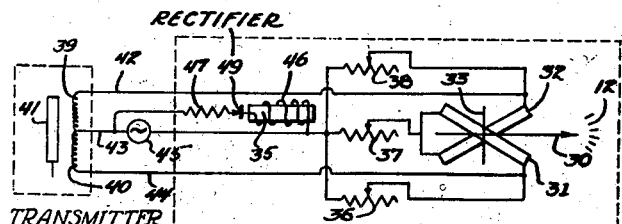
Fig. 4 is a schematic diagram of one type of telemetering circuit in which an indicator unit of the present invention may be connected.

Referring now to Fig. 4 of the drawing, there is illustrated a schematic diagram of one type of telemetering circuit in which an indicator unit made according to the present invention may be employed in conjunction with a suitable transmitter unit, for example, of the type described in my copending applications Serial No. 587,600 filed April 10, 1945, and Serial No. 594,131 filed May 16, 1945, comprising a pair of coils 39 and 40 connected in series and a core member 41 movable relative to said coils, in response to changes in pressure or rate of fluid flow, to increase the inductive reactance of one coil and simultaneously decrease the inductive reactance of the other coil, the arrangement being such that the magnetic fluxes produced by the coils 39 and 40 are opposed with the result that voltage variation in the coils for a given change in position of the core 41 is quite pronounced. As shown in said Fig. 4, three conductors 42, 43 and 44 lead from the transmitter unit to the indicator unit. The conductor 42 is connected to one end of the indicator coil 32 while the conductor 44 is connected to one end of the indicator coil 31, and the conductor 43 is connected through a source of alternating current 45 and the resistor 37 to the opposite ends of said indicator coils 31 and 32. Resistors 36 and 38 are connected in parallel with the indicator coils 31 and 32, respectively, as shown.

From the foregoing it will be evident that the telemetering system shown in Fig. 4 constitutes an impedance bridge. The transmitter coils 39 and 40 make up two legs of the bridge, and the indicator coils 31 and 32 make up the other two legs, the alternating current source 45 being connected across the diagonals of the bridge.

The dimensions of the magnetic circuits associated with the transmitter coils 39 and 40 are so proportioned that when pressure or fluid flow through the transmitter is such as to position the core 41 midway between said coils, the inductive reactance of coil 39 is equal to that of coil 40. Thus when core 41 is in the mid position the magnetic circuit for coil 39 has a reluctance which is equal to that of the magnetic circuit for coil 40. Therefore, with the core 41 in the mid position, the bridge circuit is balanced so that the current through the coil 31 of the indicator is the same as that through the coil 32 thereof and the pointer 30 accordingly will take up a position on the scale 12 as shown in Fig. 4. Should the core 41 be moved from its mid position upwardly in response to an increase in pressure or fluid flow through the transmitter, or downwardly in response to a decrease in pressure or fluid flow, it is evident that the reluctance of the magnetic circuit associated with one of the transmitter coils will be increased while the reluctance of the magnetic circuit associated with the other transmitter coil simultaneously will be decreased. To the same extent the inductive reactance of the transmitter coils will be increased and decreased respectively thus unbalancing the bridge. Simultaneously, currents through the indicator coils 31 and 32 in the other half of the bridge will also be increased and decreased, respectively, with the result that the direction of the resultant magnetic field produced by the coils 31 and 32 will shift. The shaft 25, vane 33 and pointer 30 will follow this change in direction of the resultant magnetic field, and hence the change in the pressure or rate of fluid flow through the transmitter.

The resistor 37 is adjustable and controls the sensitivity of the indicator unit or, in other words, governs travel of the pointer 30 for a given travel of the core 41 in the transmitter unit. Resistors 36 and 38 likewise are adjustable and govern the position of the limits of travel of the pointer 30 with respect to the limits of the scale 12 on the dial face 11.

As previously stated, there is secured upon the bracket member 20 a permanent magnet 35 that is positioned upon the bracket 20 with its axis substantially aligned or positioned to correspond with the position of the long axis of the permanent magnet 34 in approximately the zero position of the rotor assembly comprising the shaft 25, vane 33 and pointer member 30, and this magnet 35 is arranged to cooperate with the magnet 34 to pull the pointer member 30 off the scale 12 to the zero position, through rotation of the shaft 25 and vane 33, when the coils 31 and 32 of the indicator unit are deenergized.

However, when the coils of the indicator are energized resulting in actuation of the vane 33 and shaft 25 to move the pointer element 30 across the scale 12, the magnet 35 will continue to react with the magnet 34 (which rotates with the shaft 25) to produce a drag upon the free rotation of said shaft sufficient to introduce a small percentage error in the indicating position of the pointer 30 with respect to the scale 12 on the face plate 11.

According to the present invention, therefore, there is wound about the permanent magnet 35 a number of turns of wire 46 which are arranged and connected into the telemetering circuit so that when the indicator is energized there will flow through the turns of wire 46 a current having a magnitude and direction that will cancel or neutralize the field of the permanent pull-off magnet 35. As shown in Fig. 4, the turns of wire 46 may be connected across the alternating current source 45 and in series with a suitable resistance 47 and alternating current rectifier 49. By this arrangement it will be observed that when the indicator unit is deenergized, the turns of wire 46 about the magnet 35 likewise are deenergized and the latter functions in its intended manner to pull the pointer 30 off the scale 12 to the zero position thereof.

From the foregoing description it will be observed that the present invention provides an indicator of the ratiometer type that is constructed and arranged to provide accurate and efficient operation with alternating currents, and wherein an indicating rotor assembly is movable in response to directionally fixed magnetic fields in accordance with the ratio of the magnitudes of the alternating currents producing such fixed fields. In addition, the present invention provides an indicating unit having novel electrical means associated with an indicating pointer pull-off magnet that is operable to produce a magnetic field having a magnitude and direction that will cancel or neutralize the field of the pull-off magnet when the indicator unit is energized and operating.

While the indicator unit herein shown and described is designed primarily for accurate and efficient operation with alternating currents, it is pointed out that an indicator unit constructed and arranged as herein set forth is operable also with direct currents. Furthermore, the described arrangement for minimizing error in indication by reason of the effect of the pull-off magnet, is applicable to indicating ratiometers of the present type when used with direct current and also in conjunction with conventional direct current ratiometers. However, in such cases, since the energizing current employed is direct current, it is not necessary to provide, in the telemetering circuit, the alternating current rectifier 49.

While a particular embodiment of the present invention has been herein illustrated and described, it is not intended that the invention be limited to such disclosure, and changes and modifications may be embodied and incorporated within the scope of the claims.

The invention described herein may be manufactured and used by or for the Government of the United States of America for governmental purposes without the payment of any royalties thereon or therefor.

I claim:

1. In an indicating ratiometer of the type described, a coil form of non-metallic material having a circular bore therethrough secured, coils fixedly mounted on said coil form and arranged in predetermined angular relation with respect to one another, a shaft extending through the bore of the coil form and journalled for rotation coaxially of the bore in said coil form, a vane member of magnetic material having high permeability fixed on said shaft within the bore of said coil form, said vane being operable to align itself with the directionally resultant field of the fixed magnetic fields produced by electric currents passing through said coils and thereby rotate said shaft, a pointer member actuable by said shaft, a face plate having an indicating scale thereon disposed with respect to the pointer so that the latter is positioned with respect to said scale according to the position of the resultant field of the two directionally fixed magnetic fields of said coils, and a member of highly permeable magnetic material secured in surrounding relation with respect to said coil form to electrically shield the same.

2. In an indicating ratiometer of the type described, a pair of elongated supports, a coil form of non-metallic material having a circular bore therethrough secured on said supports, coils fixedly mounted on said coil form and arranged in predetermined angular relation with respect to one another, a housing member of good electrical conductivity secured on said supports adjacent one end thereof, a shaft extending through the bore of the coil form and journalled for rotation coaxially of the bore in said coil form, a vane member of magnetic material having high constant permeability fixed on said shaft within the bore of said coil form, said vane being operable to align itself with the resultant field of the fixed magnetic fields produced by electric currents passing through said coils and thereby rotate said shaft, a pointer member actuable by said shaft, a face plate having an indicating scale thereon disposed with respect to the pointer so that the latter is positioned with respect to said scale according to the position of the resultant field of the two fixed magnetic fields of said coils, and a permanent magnet element fixed on said shaft for rotation therewith and cooperable with said housing member to damp rotational movement of said vane member and shaft.

3. In an indicating ratiometer of the type described, a pair of elongated supports, a coil form of non-metallic material having a circular bore therethrough secured on said supports, coils fixedly mounted on said coil form and arranged in predetermined angular relation with respect to one another, a housing member of good electrical conductivity secured on said supports adjacent to one end thereof, a shaft extending through the bore of the coil form and journalled for rotation coaxially of the bore in said coil form, a vane member of magnetic material having high permeability fixed on said shaft within the bore of said coil form, said vane being operable to align itself with the resultant field of the directionally fixed magnetic fields produced by electric currents passing through said coils and thereby rotate said shaft, a pointer member actuable by said shaft, a face plate having an indicating scale thereon disposed with respect to the pointer so that the latter is positioned with respect to said scale according to the position of the resultant field of the two directionally fixed magnetic fields of said coils, a permanent magnet element fixed on said shaft for rotation therewith and cooperable with said housing member to damp rotational movement of said vane member and shaft, and a cup shaped member of highly permeable magnetic material secured on said supports at said one end thereof and extending in the direction of the other end thereof in surrounding relation with respect to said magnet, housing member and coil form to electrically shield the same.

4. In an indicating ratiometer of the type described, a pair of supports, a coil form of non-metallic material having a circular bore therethrough secured on said supports, coils fixedly mounted on said coil form and arranged in predetermined angular relation with respect to one another, a shaft extending through the bore of the coil form and journalled for rotation coaxially of the bore in said coil form, a vane member of magnetic material having high constant permeability fixed on said shaft within the bore of said coil form, said vane being operable to align itself with the resultant field of the fixed magnetic fields produced by electric currents passing through said coils and thereby rotate said shaft, a pointer member actuable by said shaft, a face plate having an indicating scale thereon disposed with respect to the pointer so that the latter is positioned with respect to said scale according to the position of the resultant field of the two fixed magnetic fields of said coils, a first permanent magnet element fixed on said shaft for rotation therewith and operable to damp rotational movement of said vane member and shaft, a second permanent magnet fixedly secured with respect to the zero position of the indication scale on said face plate cooperable with the first magnet when said coils are deenergized to rotate said shaft and vane and pull the pointer off said scale to said zero position thereof, and electrical means associated with said second magnet operable when said coils are energized to neutralize said second magnet.

5. In an indicating ratiometer of the type described, a pair of supports, a coil form of non-metallic material having a circular bore therethrough secured on said supports, coils fixedly mounted on said coil form and arranged in predetermined angular relation with respect to one another, a shaft extending through the bore of the coil form and journalled for rotation coaxially of the bore in said coil form, a vane member of magnetic material having high permeability fixed on said shaft within the bore of said coil form, said vane being operable to align itself with the resultant field of the directionally fixed magnetic fields produced by electric currents passing through said coils and thereby rotate said shaft, a pointer member actuable by said shaft, a face plate having an indicating scale thereon disposed with respect to the pointer so that the latter is positioned with respect to said scale according to the position of the resultant field of the two directionally fixed magnetic fields of said coils, a first permanent magnet element fixed on said shaft for rotation therewith and operable to damp rotational movement of said vane member and shaft, a second permanent magnet fixedly secured with respect to the zero position of the indication scale on said face plate cooperable with the first magnet when said coils are deenergized to rotate said shaft and vane and pull the pointer off said scale to said zero position thereof, and a member of highly permeable magnetic material secured on said supports in surrounding relation with respect to said magnets and coil form to electrically shield the same.

6. In an indicating ratiometer of the type described, a pair of elongated supports, a coil form of non-metallic material having a circular bore therethrough secured on said supports, coils fixedly mounted on said coil form and arranged in predetermined angular relation with respect to one another, a housing member of good electrical conductivity secured on said supports adjacent one end thereof, a frame member associated with said supports at the other end thereof, bearings in said housing and frame member disposed coaxially with respect to the circular bore in said coil form, a shaft extending through the bore of the coil form and journalled in said bearings for rotation coaxially of the bore in said coil form, a vane member of magnetic material having high permeability fixed on said shaft within the bore of said coil form, said vane being operable to align itself with the resultant field of the directionally fixed magnetic fields produced by electric currents passing through said coils and thereby rotate said shaft, a pointer member actuable by said shaft, a face plate associated with said frame member having an indicating scale thereon disposed with respect to the pointer so that the latter is positioned with respect to said scale according to the position of the resultant field of the two directionally fixed magnetic fields of said coils, a first permanent magnet element fixed on said shaft for rotation therewith and cooperable with said housing member to damp rotational movement of said vane member and shaft, a second permanent magnet fixedly secured with respect to the zero position of the indicating scale on said face plate cooperable with the first magnet when said coils are deenergized to rotate said shaft and vane and pull the pointer off said scale to said zero position thereof, electrical means associated with said second magnet operable when said coils are energized to neutralize the magnetic field of said second magnet, said means comprising a solenoidal winding placed about said second magnet and energized by suitably rectified current from the alternating current supply line, and a cup shaped member of highly permeable material secured on said supports at said one end thereof and extending in the direction of the other end thereof in surrounding relation with respect to said magnets, housing member and coil form to electrically shield the same.

HOWARD D. WARSHAW.

REFERENCES CITED

The following references are of record in the file of this patent:

UNITED STATES PATENTS

| Number | Name | Date |
|---|---|---|
| 2,345,011 | Sias (I) | Mar. 28, 1944 |
| 2,354,618 | Sias (II) | July 25, 1944 |
| 2,362,562 | Kelly | Nov. 4, 1944 |
| 2,354,902 | Wolferz | Aug. 1, 1944 |
| 2,342,947 | Lingel | Feb. 29, 1944 |
| 1,964,228 | Tanner | June 26, 1934 |